United States Patent [19]

Guy

[11] Patent Number: 5,653,194
[45] Date of Patent: Aug. 5, 1997

[54] COLLAPSIBLE PORTABLE ANIMAL CRATE

[76] Inventor: Jane R. Guy, 219 Drum Ave. South, Pasadena, Md. 21122

[21] Appl. No.: 540,549
[22] Filed: Oct. 6, 1995
[51] Int. Cl.$^6$ ................................................. A01K 1/03
[52] U.S. Cl. ................................................. 119/453
[58] Field of Search .............................. 119/453, 455, 119/461, 474, 482, 491, 498, 502, 504, 513, 514

[56] References Cited

U.S. PATENT DOCUMENTS

| 1,458,736 | 6/1923 | Stewart | 119/455 |
| 2,965,259 | 12/1960 | Johnson | 119/474 X |
| 3,058,445 | 10/1962 | Johnson | 119/474 |
| 3,556,058 | 1/1971 | Smiler | 119/474 |
| 3,896,766 | 7/1975 | Martin | 119/474 |
| 4,762,085 | 8/1988 | Ondrasik | 119/474 |
| 4,917,047 | 4/1990 | Wazeter, III | 119/474 |
| 5,549,073 | 8/1996 | Askins et al. | 119/461 X |

FOREIGN PATENT DOCUMENTS 2752894  6/1979  Germany ................ 119/453

Primary Examiner—Thomas Price

[57] ABSTRACT

A collapsible portable animal crate including a tray with a border formed of a pair of long edges with a pair of short edges extended therebetween; a pair of spaced opposed rectangular end walls each having a bottom edge, a top edge, and a pair of opposed side edges extended therebetween and with the bottom edge of each end wall hingeably coupled to one of the short edges of the tray; a pair of spaced opposed side walls each having a bottom edge, a top edge, and a pair of opposed side edges extended therebetween and with the bottom edge of each side wall hingeably coupled to one of the long edges of the tray; a top wall having a pair of short edges with a pair of long edges extended therebetween and with the long edges coupled to the top edges of the side walls, the side walls and end walls upwardly extended from the tray with the top wall positioned thereover to define a box-shaped expanded operable configuration and with the side walls, end walls, and top wall positionable in stacked juxtaposed relation with the tray to define a collapsed stowed configuration; and a wheel mechanism coupled to the tray.

1 Claim, 4 Drawing Sheets

COLLAPSIBLE PORTABLE ANIMAL CRATE

BACKGROUND OF THE INVENTION

1. Field of the Invention

The present invention relates to a collapsible portable animal crate and more particularly pertains to allowing an animal to be transported therein when the animal crate is placed in an expanded operable configuration and further allowing ready transport when the animal crate is placed in a collapsed stowed configuration with a collapsible portable animal crate.

2. Description of the Prior Art

The use of animal crates is known in the prior art. More specifically, animal crates heretofore devised and utilized for the purpose of holding animals therein are known to consist basically of familiar, expected and obvious structural configurations, notwithstanding the myriad of designs encompassed by the crowded prior art which have been developed for the fulfillment of countless objectives and requirements.

By way of example, U.S. Pat. Des. 282,880 to Barati discloses an animal crate. U.S. Pat. No. 3,710,761 to Gregory discloses an animal shipping crate. U.S. Pat. No. 3,773,071 to Johannes discloses an animal crate for pick-up trucks. U.S. Pat. No. 3,962,994 to Petrucciani discloses a dog kennel module. U.S. Pat. No. 5,158,041 to Schmidtz discloses an animal holding crate.

While these devices fulfill their respective, particular objective and requirements, the aforementioned patents do not describe an animal crate that is collapsible and expandable and has wheels secured thereto for allowing its ready rollable transport from one location to another.

In this respect, the collapsible portable animal crate according to the present invention substantially departs from the conventional concepts and designs of the prior art, and in doing so provides an apparatus primarily developed for the purpose of allowing an animal to be transported therein when the animal crate is placed in an expanded operable configuration and further allowing ready transport when the animal crate is placed in a collapsed stowed configuration.

Therefore, it can be appreciated that there exists a continuing need for new and improved collapsible portable animal crate which can be used for allowing an animal to be transported therein when the animal crate is placed in an expanded operable configuration and further allowing ready transport when the animal crate is placed in a collapsed stowed configuration. In this regard, the present invention substantially fulfills this need.

SUMMARY OF THE INVENTION

In the view of the foregoing disadvantages inherent in the known types of animal crates now present in the prior art, the present invention provides an improved collapsible portable animal crate. As such, the general purpose of the present invention, which will be described subsequently in greater detail, is to provide a new and improved collapsible portable animal crate and method which has all the advantages of the prior art and none of the disadvantages.

To attain this, the present invention essentially comprises, in combination, a rigid tray having a rectangular horizontal bottom wall with a border extended peripherally upwards therefrom formed of a pair of planar vertical long walls with a pair of opposed planar vertical short walls extended therebetween. A pair of spaced opposed rectangular end walls formed of a planar wire mesh material are included. Each end wall has a bottom edge, a top edge, and a pair of opposed side edges extended therebetween and with the bottom edge of each end wall hingeably coupled to one of the short walls of the tray. One of the end walls further has a rectangular opening formed thereon and a rectangular door formed of a planar wire mesh material hingeably coupled thereto and securable over the opening. A pair of spaced opposed rectangular side walls formed of a planar wire mesh material are included. Each side wall has a bottom edge, a top edge, and a pair of opposed side edges extended therebetween and with the bottom edge of each side wall separately hingeably coupled to one of the long walls of the tray. A rectangular top wall formed of a planar wire mesh material is included. The top wall has a pair of short edges with a pair of long edges extended therebetween. Each of the short edges of the top wall is coupled to the top edges of each of the end walls with moveable clip attachments. The side walls and end walls are extendable upwards from the tray with the top wall positioned thereover to thereby define a rectangular box-shaped expanded operable configuration with a hollow interior portion. The side walls, end walls, and top wall are further positionable in stacked juxtaposed relation with the tray to thereby define a collapsed stowed configuration. A wheel mount is provided and includes a pair of elongated rigid opposed brackets secured to one of the long walls of the tray, a pair of spaced bifurcated stems coupled to and extended from one of the brackets, and wheels rotatably coupled to the stems. The axes of the wheels are positionable in perpendicular alignment with respect to the bottom wall of the tray. A plurality of movable clip attachments is secured between adjacent edges of the walls for maintaining the walls in an operable configuration. Lastly, a first, a second, and a third carrying handle are included with the first carrying handle coupled to the top edge of one of the end walls, the second carrying handle coupled to the top edge of the other end wall, and the third carrying handle coupled to the long wall of the tray at a location remote from the wheel mount.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved collapsible portable animal crate which has all the advantages of the prior art animal crates and none of the disadvantages.

It is another object of the present invention to provide a new and improved collapsible portable animal crate which may be easily and efficiently manufactured and marketed.

It is a further object of the present invention to provide a new and improved collapsible portable animal crate which is of durable and reliable construction.

An even further object of the present invention is to provide a new and improved collapsible portable animal crate which is susceptible of a low cost of manufacture with regard to both materials and labor, and which accordingly is then susceptible of low prices of sale to the consuming public, thereby making such a collapsible portable animal crate economically available to the buying public.

Still yet another object of the present invention is to provide a new and improved collapsible portable animal crate which provides in the apparatuses and methods of the prior art some of the advantages thereof, while simultaneously overcoming some of the disadvantages normally associated therewith.

Even still another object of the present invention is to provide a new and improved collapsible portable animal crate for allowing an animal to be transported therein when the animal crate is placed in an expanded operable configuration and further allowing ready transport when the animal crate is placed in a collapsed stowed configuration.

Lastly, it is an object of the present invention to provide a new and improved collapsible portable animal crate comprising a rectangular tray having a bottom and border formed of a pair of long edges with a pair of short edges extended therebetween; a pair of spaced opposed rectangular end walls each having a bottom edge, a top edge, and a pair of opposed side edges extended therebetween and with the bottom edge of each end wall hingeably coupled to one of the short edges of the tray; a pair of spaced opposed rectangular side walls each having a bottom edge, a top edge, and a pair of opposed side edges extended therebetween and with the bottom edge of each side wall separately hingeably coupled to one of the long edges of the tray; a rectangular top wall having a pair of short edges with a pair of long edges extended therebetween and with the long edges coupled to the top edges of the side walls, the side walls and the end walls upwardly perpendicularly extended from the bottom of the tray with the top wall positioned thereover to thereby define a box-shaped expanded operable configuration and with the side walls, end walls, and top wall positionable in stacked juxtaposed relation with the tray to thereby define a collapsed stowed configuration; and wheel means coupled to one of the long walls of the tray for allowing ready rollable transport of the collapsed stowed configuration.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
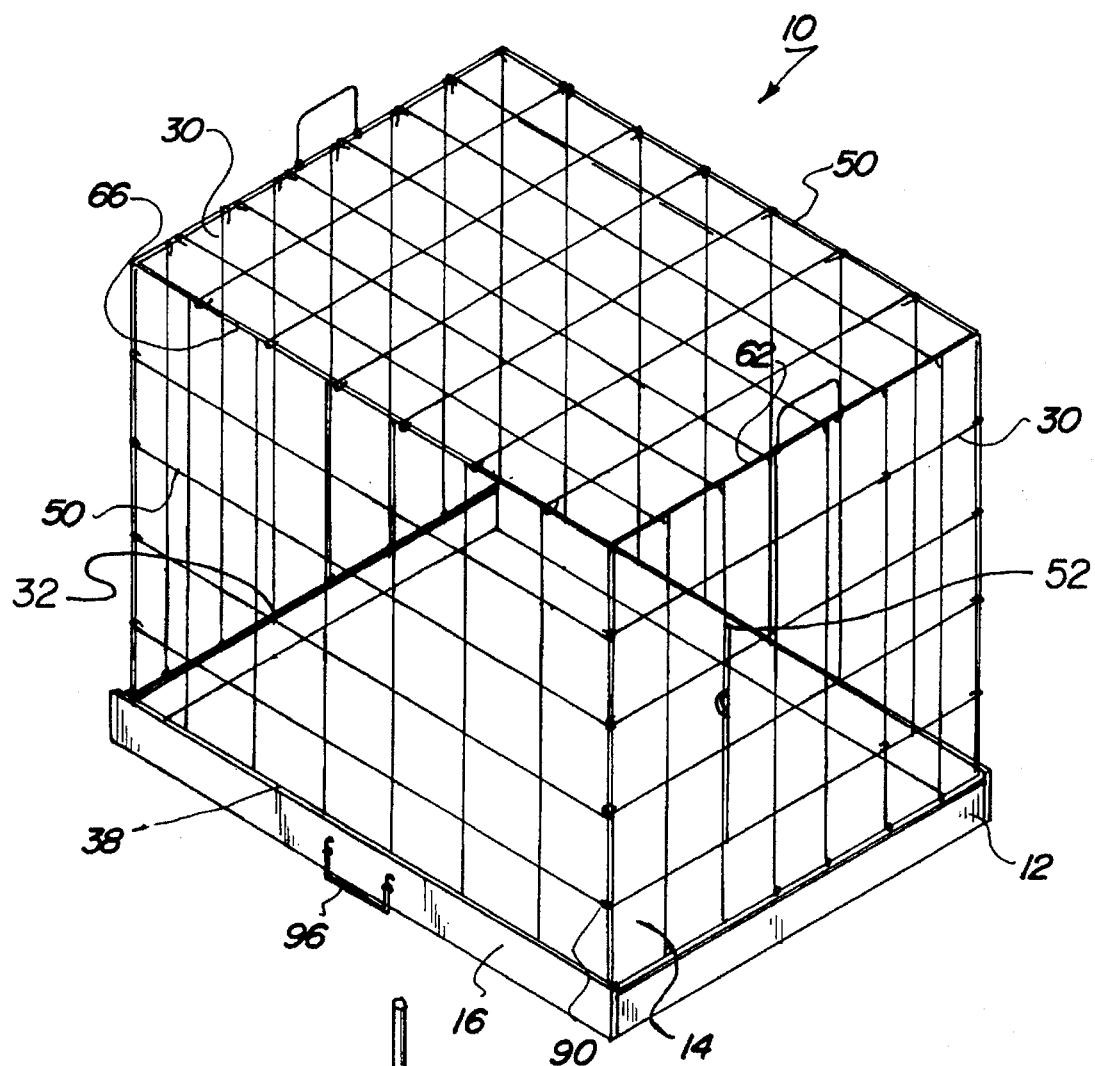
FIG. 1 is a perspective view of the preferred embodiment constructed in accordance with the principles of the present invention.

With reference now to the drawings, and in particular, to FIG. 1 thereof, the preferred embodiment of the new and improved collapsible portable animal crate embodying the principles and concepts of the present invention and generally designated by the reference number 10 will be described.

The preferred embodiment of the present invention comprises a plurality of components. In their broadest context, such components include a tray, walls, a wheel mount, clip attachments, and handles. Such components are individually configured and correlated with respect to each other to provide a crate that can be used to transport an animal therein when placed in an expanded operable configuration yet be readily rollably transported when placed in a collapsed stowed configuration.

Figure 7:
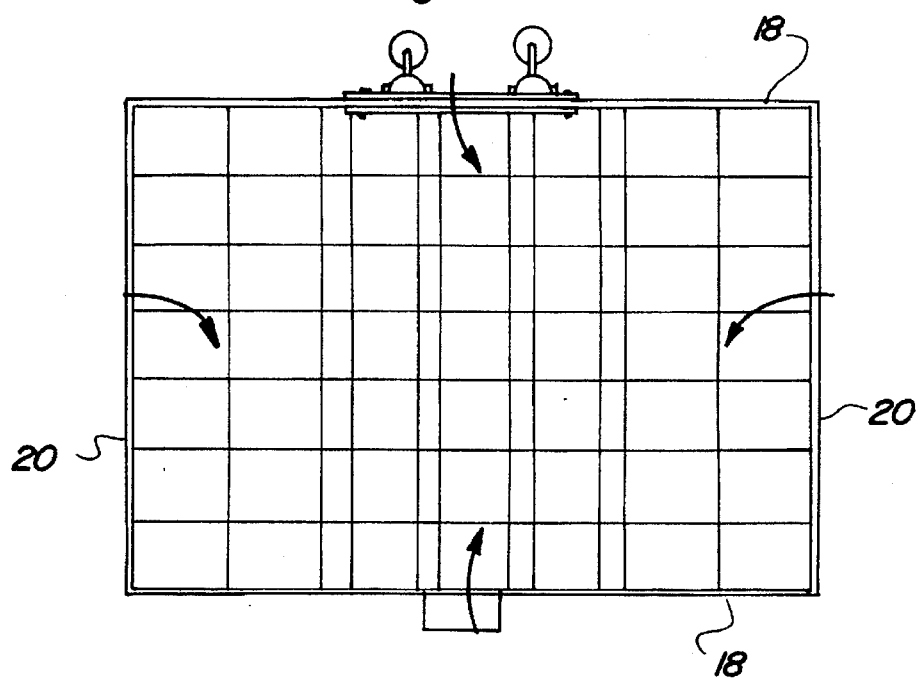
FIG. 7 is a plan view of the present invention and further depicts the folding of the walls for placing the present invention in a stowed configuration.

Specifically, the present invention includes a tray 12. The tray is formed of a rigid, rust proof, non-porous material. The tray has a rectangular planar horizontal bottom wall 14 with a border 16 extended peripherally upwards therefrom as shown in FIG. 1. As best illustrated in FIG. 7, the border is formed of a pair of planar and vertical long walls 18 with a pair of opposed planar vertical short walls 20 extended therebetween. As best shown in FIG. 1, the short walls of the tray each have a height less than that of the long walls of the tray. The tray provides a stationary platform upon which an animal can rest and further contains animal food, drink, or waste within an enclosed space.

Figure 2:
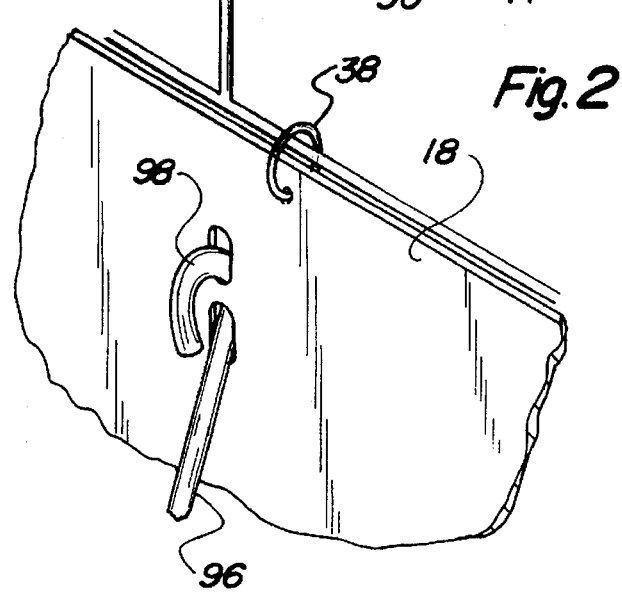
FIG. 2 is an enlarged cut-away view of the upper edge of the tray and an upper view of the securement of a carrying handle to the tray of the present invention.
Figure 6:
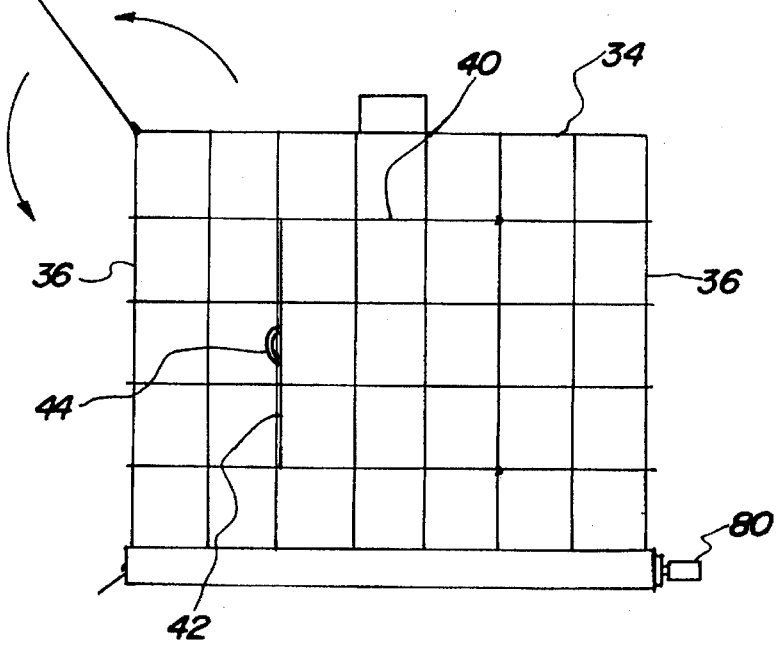
FIG. 6 is another side elevational view of the present invention with the top wall positioned away from the other walls.

Also included is a pair of spaced and opposed end walls 30 as shown in FIG. 1. The end walls are rectangular in structure and formed of a planar steel wire mesh material. Each end wall has a bottom edge 32, a top edge 34 and a pair of opposed side edges 36 extended therebetween as shown in FIG. 6. The bottom edge of each end wall is hingeably coupled to one of the short walls of the tray with steel rings 38 as shown in FIGS. 1 and 2. One of the end walls further has a rectangular opening 40 formed thereon and a rectangular door 42 formed of a planar steel wire mesh material hingeably coupled thereto as shown in FIG. 6. The door is securable over the opening to preclude or allow access of an animal. A steel loop 44 is secured to the door for allowing its ready opening and closing.

A pair of spaced opposed side walls 50 are provided. Each side wall is rectangular in structure and formed of a planar steel wire mesh material. Each side wall has a bottom edge 52, a top edge 54 and a pair of opposed side edges 56 extended therebetween. As best illustrated in FIG. 1, the bottom edge 52 of each side wall is separately hingeably coupled to one of the long walls of the tray with steel rings 38. The hingeable connections of end walls and the short walls of the tray are positioned approximately one inch lower than the hingeable connections of the side walls and the long walls of the tray to facilitate collapsing of the crate.

Figure 8:
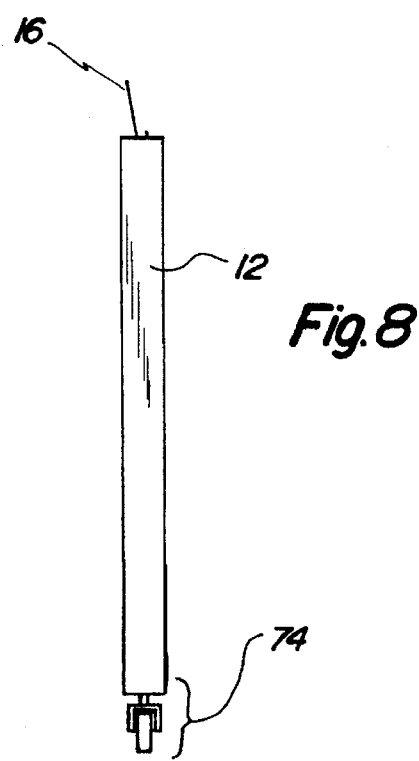
FIG. 8 is a side elevational view of the present invention in a stowed configuration.

Lastly, a top wall 60 is provided. The top wall is rectangular in structure and formed of a planar steel wire mesh material like the other walls. The top wall has a pair of short edges 62 with a pair of long edges 66 extended therebetween as best illustrated in FIG. 1. The side walls and end walls are extendable upwards from the tray with the top wall positioned thereover to thereby define a rectangular and box-shaped expanded operable configuration with a hollow interior portion for holding an animal therein. In addition, the side walls, end walls, and top wall are positionable in a stacked juxtaposed relation with the tray to thereby define a collapsed stowed configuration as shown in FIG. 8. The short walls of the tray have a height less than the long walls of the tray to allow the end walls to fold down onto the bottom of the tray and allow the side walls to fold down on top of the end walls.

Figure 3:
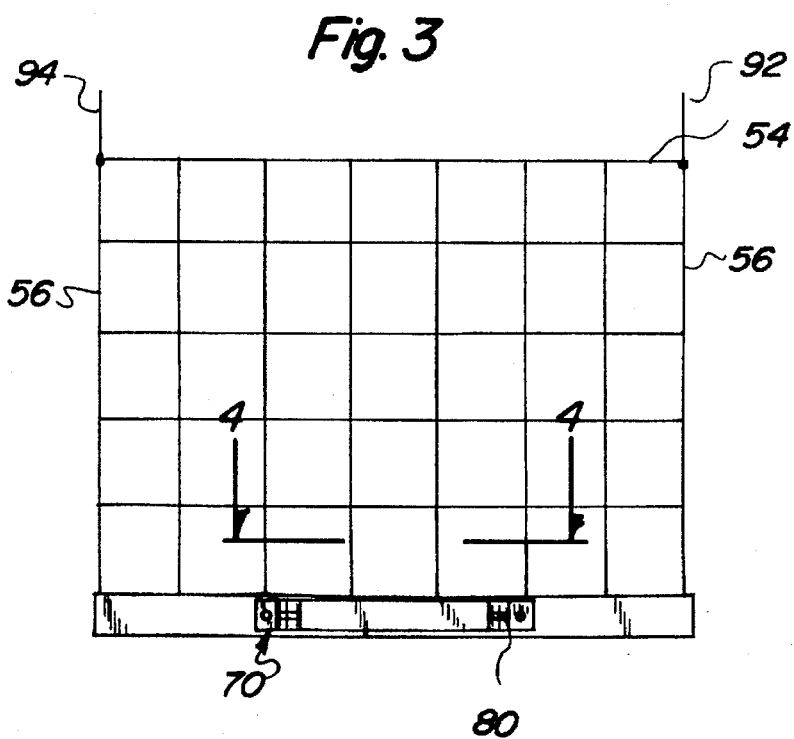
FIG. 3 is a side elevational view of the present invention in an operable configuration.
Figure 4:
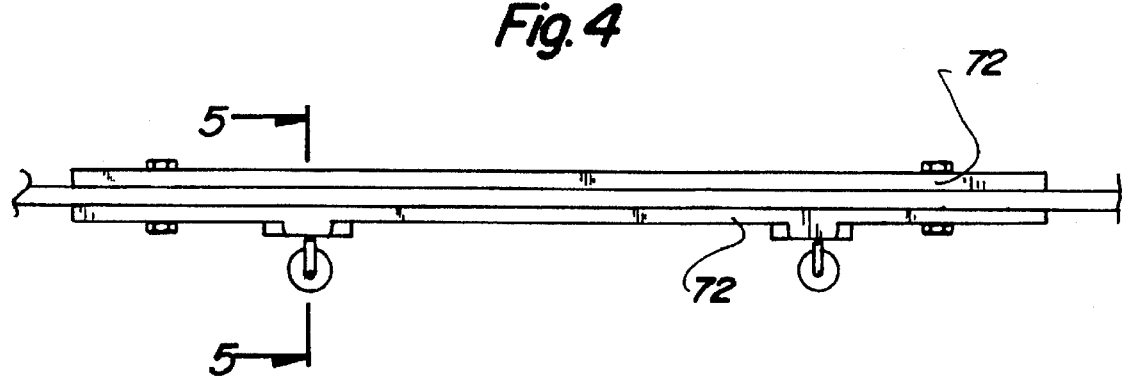
FIG. 4 is a view of the wheel mount of the present invention taken along the line 4—4 of FIG. 3.
Figure 5:
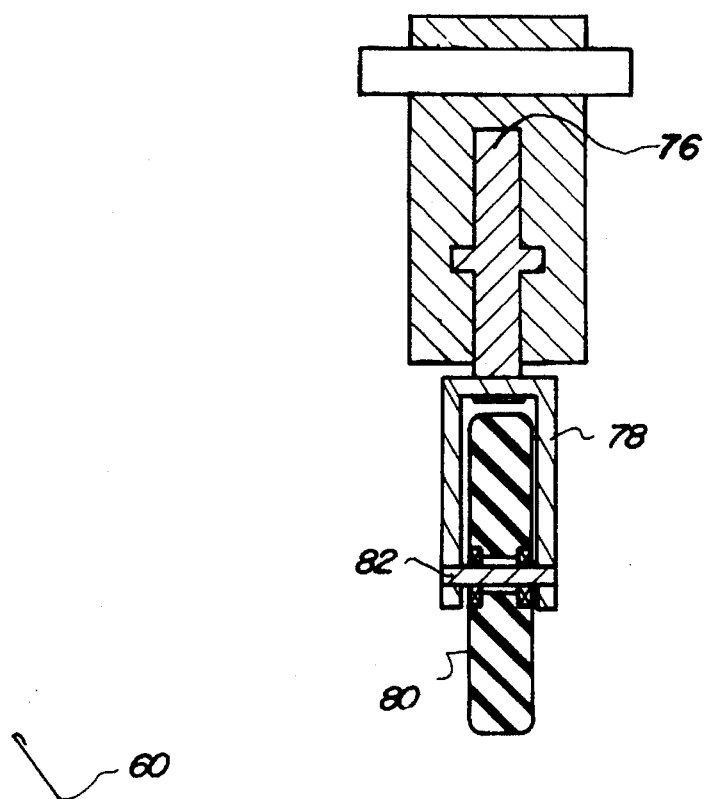
FIG. 5 is a cross-sectional view of the wheel mount taken along the line 5—5 of FIG. 4.

Furthermore, with respect to FIG. 8, a wheel mount 70 is included. The wheel mount includes a pair of elongated, rigid, and opposed steel brackets 72 secured to one of the long walls of the tray as shown in FIGS. 3 and 4. The wheel mount includes a pair of spaced, rigid, and bifurcated steel stems 74 coupled to and extended in a planar fashion from one of the brackets. Each stem 74 includes an upper portion 76 and a lower bracket portion 78 as shown in FIG. 5. In addition, a pair of wheels 80 are rotatably coupled to the stems 74 with pegs 82. Each wheel is rotatable about an axis defined by its associated peg. The axes of the wheels are positionable in a perpendicular alignment with respect to the bottom wall of the tray as best shown in FIG. 3.

To secure the walls in an operable configuration, a plurality of movable clip attachments 90 as shown in FIG. 1 are provided. The clip attachments are formed of a generally resilient metal. The clip attachments are movably secured between adjacent edges of the walls 30, 50, and 60. When the clip attachments are secured between the walls, the box-shaped configuration of the crate is maintained. When the clip attachments are moved, the crate can be collapsed into the stowed configuration. Furthermore, when the present invention is placed in the stowed configuration, the clip attachments are used for holding the walls in the stacked relation as shown in FIG. 8.

Lastly, a first carrying handle 92, a second carrying handle 94, and a third carrying handle 96 are included. The carrying handles are formed of steel wire. The first carrying handle is coupled to one of the top edges of one of the end walls and the second carrying handle is coupled to the other top edge of the other end wall as shown in FIG. 3. Both the first and second carrying handles are generally u-shaped in structure and hingeably secured to the applicable edge with bends. The third carrying handle is coupled to the long wall of the tray at a location remote from the wheel mount as best illustrated in FIGS. 2 and 7. The third carrying handle is hingeably secured to the tray with bends 98. The third carrying handle allows a user a firm grip for carrying or rolling the crate upon a recipient surface when placed in a stowed configuration. The first and second carrying handles allow the crate to be transported in an open operable position such as shown in FIG. 6.

The present invention is a collapsible kennel crate that has wheels on its bottom which enable it to be rolled when it is folded for storage and transport. The crate is made from steel wire, handles, clip attachments, and wheels. The space interval of the wire mesh assures confinement and safety of an animal. The wire cage is somewhat similar to commercially available animal cages and could be available in a range of sizes. The crate is constructed of six connected walls which unfold to make a full size crate. The peripheral walls of the tray each have a height of about 3 inches. The side walls and end walls attach to the tray with steel rings to define hingeable connections. The top and side of the walls attach to the adjacent walls with movable steel clip attachments or hinges. The wheels are positioned on one long wall of the tray of the present invention. One handle is positioned to permit rolling of the present invention when positioned in a stowed configuration on its two wheels. When an animal is released from the present invention, the two end walls are folded onto the tray. The end wall with the door is folded in first, and then the other end wall is folded onto it. The first and second handles are folded back upon the associated end walls. One of the side walls is grasped and lifted, allowing the other side wall to fall forward and lie upon the two end walls. The top wall then folds onto the side wall, and, finally, both of these walls are then folded onto the other walls to create a compact package that is approximately 4 inches thick. The clip attachments may then be used to secure the folded walls in place. The present invention thus provides a collapsible wire animal cage that is easy to move and store.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A collapsible portable animal crate for allowing an animal to be transported therein when the animal crate is placed in an expanded operable configuration and further allowing ready transport when the animal crate is placed in a collapsed stowed configuration comprising, in combination:

- a rigid tray having a rectangular horizontal bottom wall with a border extended peripherally upwards therefrom formed of a pair of planar vertical long walls with a pair of opposed planar vertical short walls extended therebetween and with the short walls each having a height less than the long walls, the tray providing a platform within an enclosed space;

- a pair of spaced opposed rectangular end walls formed of a planar wire mesh material, each end wall having a bottom edge, a top edge, and a pair of opposed side edges extended therebetween and with the bottom edge of each end wall hingeably coupled to one of the short walls of the tray with a plurality of rings, one of the end walls further having a rectangular opening formed thereon and a rectangular door formed of a planar wire mesh material hingeably coupled thereto and securable over the opening for preclusion of escape and access of an animal, a loop being secured to the door for allowing ready opening and closing of door;

- a pair of spaced opposed rectangular side walls formed of a planar wire mesh material, each side wall having a bottom edge, a top edge, and a pair of opposed side edges extended therebetween and with the bottom edge of each side wall separately hingeably coupled to one of the long walls of the tray with a plurality of rings, the hingeable connections of the end walls and the short walls of the tray are positioned approximately one inch lower than the hingeable connections of the side walls and the long walls of the tray to facilitate collapsing of each of the walls;

- a rectangular top wall formed of a planar wire mesh material, the top wall having a pair of short edges with a pair of long edges extended therebetween and with the long edges coupled to the top edges of the side walls, the side walls and end walls extendable upwards from the tray with the top wall positioned thereover to thereby define a rectangular box-shaped expanded operable configuration with a hollow interior portion for holding the animal within, and with the side walls, end walls, and top wall positionable in stacked juxtaposed relation with the tray to thereby define a collapsed stowed configuration for storage the short walls of the tray having a height less than the long walls of the tray to allow the end walls to fold down onto the bottom of the tray and allow the side walls to fold down on top of the end walls;

- a wheel mount including a pair of elongated rigid opposed brackets secured to one of long walls of the tray, a pair of spaced bifurcated stems coupled to and extended in a planar fashion from one of the brackets, and a wheel rotatably coupled to each of the stems with pegs and with the axes of the wheels positionable in perpendicular alignment with respect to the bottom wall of the tray;

- a plurality of movable clip attachments secured between adjacent edges of the walls for maintaining the walls in an operable configuration the clip attachments being removably secured between adjacent edges of the end walls, side walls and top wall for allowing the walls to form a box-shaped configuration the clip attachments being removed and repositioned for securing the walls in a stacked relationship when collapsed; and

- a first, a second, and a third carrying handle with the first carrying handle coupled to one of the top edges of one of the end walls, the second carrying handle coupled to the other top edge of the other end wall, and the third carrying handle coupled to the long wall of the tray at a location remote from the wheel mount for allowing a user a firm grip for carrying or pushing the crate when placed in the stowed configuration.

* * * * *